US010298336B1

(12) United States Patent
Tabatabai et al.

(10) Patent No.: US 10,298,336 B1
(45) Date of Patent: May 21, 2019

(54) ISOLATING DUAL POLARIZED PATCH ANTENNAS (71) Applicant: Google Inc., Mountain View, CA (US)

(72) Inventors: Farbod Tabatabai, Menlo Park, CA (US); Eduardo Tinoco, Surprise, AZ (US); Kevin Klug, Mountain View, CA (US)

(73) Assignee: Google LLC, Mountain View, CA (US)

( * ) Notice: Subject to any disclaimer, the term of this patent is extended or adjusted under 35 U.S.C. 154(b) by 131 days.

(21) Appl. No.: 15/298,697

(22) Filed: Oct. 20, 2016

(51) Int. Cl.
*H04B 7/10* (2017.01)
*H04B 1/525* (2015.01)
*H01Q 3/36* (2006.01)
*H01Q 9/04* (2006.01)
*H04B 1/04* (2006.01)
*H01Q 21/24* (2006.01)
*H04B 17/10* (2015.01)

(52) U.S. Cl.
CPC ............. *H04B 17/103* (2015.01); *H01Q 3/36* (2013.01); *H01Q 9/0407* (2013.01); *H01Q 9/0435* (2013.01); *H01Q 21/24* (2013.01); *H04B 1/525* (2013.01); *H04B 7/10* (2013.01); *H04B 2001/0433* (2013.01)

(58) Field of Classification Search
CPC .... H01Q 21/24; H01Q 9/0407; H01Q 21/245; H01Q 1/38; H04B 1/525; H04B 7/15585
See application file for complete search history.

(56) References Cited

U.S. PATENT DOCUMENTS

| | | | | |
|---|---|---|---|---|
| 6,069,590 A | * | 5/2000 | Thompson, Jr. | H01Q 1/42 343/795 |
| 2005/0226353 A1 | * | 10/2005 | Gebara | H01Q 1/521 375/346 |
| 2008/0144689 A1 | * | 6/2008 | Crouch | H01Q 3/26 372/57 |
| 2015/0381265 A1 | * | 12/2015 | Runyon | H01Q 1/288 455/13.3 |
| 2017/0353338 A1 | * | 12/2017 | Amadjikpe | H01Q 9/0407 |

* cited by examiner

*Primary Examiner* — Ricardo I Magallanes
(74) *Attorney, Agent, or Firm* — Honigman LLP (57) ABSTRACT

A port isolator for an antenna having a horizontal polarization input port and a vertical polarization input port includes a first signal coupler, a signal adjuster, and a second signal coupler. The first signal coupler is configured to sample a signal received on one of the input ports of the antenna. The signal adjuster is electrically coupled to the first signal coupler. The second signal coupler is electrically coupled to the signal adjuster and the other one of the input ports of the antenna. The signal adjuster is configured to adjust a phase and an amplitude of the sampled signal based on a leakage power and a leakage phase of a leakage signal from the input port receiving the signal to the other input port. The adjusted sampled signal substantially cancels out the leakage power and leakage phase from the input port receiving the signal to the other input port.

16 Claims, 8 Drawing Sheets

FIG. 3

ISOLATING DUAL POLARIZED PATCH ANTENNAS

TECHNICAL FIELD

This disclosure relates to isolating port leakage on dual polarized patch antennas.

BACKGROUND

Within the field of antennas, patch antennas are a relatively recent innovation seeing steadfast development. Patch antennas have become a more common means of communication due to their low-cost and dimension controlled construction. Typically, a patch antenna or a micro-strip antenna is a type of printed antenna having a conductive patch with transmission line feeds backed by a ground plane. As feed methods have enhanced the antenna's bandwidth, patch antennas have seen more widespread use as a type of dual polarized antenna. The communication industry generally utilizes dual polarized antennas to double the potential communication capacity of a single antenna. Dual polarized antennas achieve this increased capacity due to the orthogonal polarization of two ports on the antenna rather than one.

SUMMARY

One aspect of the disclosure provides a port isolator for an antenna having a horizontal polarization input port and a vertical polarization input port. The port isolator includes a first signal coupler, a signal adjuster, and a second signal coupler. The first signal coupler is configured to sample a signal received on one of the horizontal polarization input port of the antenna or the vertical polarization input port of the antenna. The signal adjuster is electrically coupled to the first signal coupler. The signal adjuster includes a phase shifter and an amplitude adjuster. The second signal coupler is electrically coupled to the signal adjuster and the other one of the input ports of the antenna. The signal adjuster is configured to adjust a phase and an amplitude of the sampled signal based on a leakage power and a leakage phase of a leakage signal from the input port receiving the signal to the other input port. The adjusted sampled signal substantially cancels out the leakage power and leakage phase from the input port receiving the signal to the other input port.

Implementations of the disclosure may include one or more of the following optional features. In some implementations, the port isolator includes a power detector configured to measure the leakage power of the leakage signal from the input port receiving the signal to the other input port. The port isolator may also include a phase detector configured to measure a leakage phase of the leakage signal from the input port receiving the signal to the other input port.

In some examples, the port isolator includes a controller in communication with the signal adjuster. The controller may be configured to instruct the phase shifter to adjust the phase of the sampled signal based on the leakage power and instruct the amplitude adjuster to adjust the amplitude of the sampled signal based on the leakage amplitude. At least one signal coupler may include a directional coupler, a broad line coupler, a branch line coupler, or a hybrid coupler. The amplitude adjuster may include a variable attenuator.

Another aspect of the disclosure provides a system for isolating dual polarized patch antennas. The system includes an antenna having a horizontal polarization input port and a vertical polarization input port and at least one port isolator.

The port isolator includes a first signal coupler, a signal adjuster, and a second signal coupler. The first signal coupler is configured to sample a signal received on one of the horizontal polarization input port of the antenna or the vertical polarization input port of the antenna. The signal adjuster is electrically coupled to the first signal coupler. The signal adjuster includes a phase shifter and an amplitude adjuster. The second signal coupler is electrically coupled to the signal adjuster and the other one of the input ports of the antenna. The signal adjuster is configured to adjust a phase and an amplitude of the sampled signal based on a leakage power and a leakage phase of a leakage signal from the input port receiving the signal to the other input port. The adjusted sampled signal substantially cancels out the leakage power and the leakage phase from the input port receiving the signal to the other input port.

This aspect may include one or more of the following optional features. In some implementations, the system includes a power detector, a phase detector, and a controller. The power detector may be configured to measure the leakage power of the leakage signal from the input port receiving the signal to the other input port. The phase detector may be configured to measure a leakage phase of the leakage signal from the input port receiving the signal to the other input port. The controller may be in communication with the power detector, the phase detector, and the signal adjuster. The controller may be configured to instruct the phase shifter to adjust the phase of the sampled signal based on the leakage power and instruct the amplitude adjuster to adjust the amplitude of the sampled signal based on the leakage amplitude.

In some examples, the system includes first and second substrate layers and a communication pathway. The antenna may be disposed on the first substrate layer. The communication pathway includes at least one port isolator and electrically couples together the first signal coupler, the signal adjuster, and the second signal coupler. In some implementations, the communication pathway is disposed on at least one of the first substrate layer or the second substrate layer. Additionally, the first and second couplers of the at least one port isolator may be disposed on the first substrate layer. Moreover, the signal adjuster of the at least one port isolator may be disposed on the second substrate layer. In additional implementations, the communication pathway is disposed entirely on the second substrate layer. Furthermore, the system may include a third substrate layer, where the communication pathway is disposed on the second substrate layer and the third substrate layer.

The at least one port isolator may include first and second port isolators. The first signal coupler of the first port isolator is configured to sample a first signal received on the horizontal polarization input port of the antenna. The second signal coupler of the first port isolator is electrically coupled to the vertical polarization input port of the antenna. The signal adjuster of the first port isolator is configured to adjust a phase and an amplitude of the sampled first signal based on a leakage power and a leakage phase of a first leakage signal from the horizontal polarization input port of the antenna to the vertical polarization input port of the antenna. The adjusted sampled first signal substantially cancels out the leakage power and leakage phase from the horizontal polarization input port of the antenna to the vertical polarization input port of the antenna. The first signal coupler of the second port isolator is configured to sample a second signal received on the vertical polarization input port of the antenna and the second signal coupler of the second port isolator is electrically coupled to the horizontal polarization input port of the antenna. The signal adjuster of the second port isolator is configured to adjust a phase and an amplitude of the sampled second signal based on a leakage power and a leakage phase of a second leakage signal from the vertical polarization input port of the antenna to the horizontal polarization input port of the antenna. The adjusted sampled second signal substantially cancels out the leakage power and leakage phase from the vertical polarization input port of the antenna to the horizontal polarization input port of the antenna.

In some examples, the system includes first and second substrate layers, a first communication pathway, and a second communication pathway. The antenna may be disposed on the first substrate layer. The first communication pathway includes the first port isolator and electrically couples together the first signal coupler, the signal adjuster, and the second signal coupler of the first port isolator. The second communication pathway includes the second port isolator and electrically couples together the first signal coupler, the signal adjuster, and the second signal coupler of the second port isolator. The first communication pathway and the second communication pathway may each be disposed on at least one of the first substrate layer or the second substrate layer.

The first and second signal couplers of each port isolator may be disposed on the first substrate layer and the signal adjusters of each port isolator may be disposed on the second substrate layer. In some implementations, the first communication pathway and the second communication pathway are disposed entirely on the second substrate layer. In additional implementations, the system includes a third substrate layer, where the first communication pathway and the second communication pathway are disposed on the second substrate layer and the third substrate layer. At least one signal coupler may include a directional coupler, a broad line coupler, a branch line coupler, or a hybrid coupler. The amplitude adjuster may include a variable attenuator.

Yet another aspect of the disclosure provides a second system for isolating dual polarized patch antennas. The system includes an antenna, a signal coupler, a signal adjuster, a power detector, a phase detector, and a controller. The antenna has a horizontal polarization input port and a vertical polarization input port. The signal coupler is configured to sample a signal received on one of the input ports. The signal adjuster is electrically coupled to the first coupler. The signal adjuster includes a phase shifter and an amplitude adjuster. The power detector is configured to measure a leakage power from the input port receiving the signal to the other input port. The phase detector is configured to measure a leakage phase from the input port receiving the signal to the other input port. The controller is in communication with the power detector, the phase detector, and the signal adjuster. The controller is configured to instruct the phase shifter to adjust a phase of the sampled signal based on the measured leakage power and instruct the amplitude adjuster to adjust an amplitude of the sampled signal based on the measured leakage amplitude. The adjusted sampled signal substantially cancels out the leakage power and leakage phase from the input port receiving the signal to the other input port.

Yet another aspect of the disclosure provides a method for isolating dual polarized patch antennas. The method includes receiving a signal at an antenna having a horizontal polarization input port and a vertical polarization input port, the signal received at one of the input ports. The method further includes measuring, by a power detector, a signal power leakage of a leakage signal from the input port receiving the signal to the other input port and measuring, by a phase detector, a signal phase leakage of the leakage signal from the input port receiving the signal to the other input port. The method includes sampling the signal using a first signal coupler on the input port receiving the signal and adjusting, by a signal adjuster, a phase of the sampled signal based on the measured leakage phase and an amplitude of the sampled signal based on the measured leakage power. The method includes feeding the adjusted sampled signal to a second signal coupler on the other input port. The adjusted sampled signal substantially cancels out the leakage power and leakage phase from the input port receiving the signal to the other input port.

This aspect may include one or more of the following optional features. In some implementations, the signal adjuster includes a phase shifter for adjusting the phase of the sampled signal based on the measured leakage phase and an amplitude adjuster for adjusting the amplitude of the sampled signal based on the measured leakage power. In some examples, the antenna is disposed on a first substrate layer and a communication pathway is disposed on at least one of the first substrate layer or a second substrate layer. The communication pathway includes and electrically couples together the first signal coupler, the signal adjuster, and the second signal coupler. The first and second signal couplers may be disposed on the first substrate layer and the signal adjuster may be disposed on the second substrate layer. In some examples, the communication pathway is disposed entirely on the second substrate layer. Additionally or alternatively, the communication pathway is disposed on the second substrate layer and a third substrate layer.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Dual polarized antennas generally suffer from low port isolation (or high cross polarization), where radiation from a first input port leaks to a second input port. In other words, two input ports may be coupled to each other to an undesired level causing radio desensitization, deteriorated impedance, deteriorated radiation pattern, and interference to another chain. Moreover, low port isolation or high cross polarization generally causes inaccurate phase and amplitude calibration for the dual polarized antennas. The present disclosure describes a communication system having high port isolation and low cross polarization. In some implementations, the system cancels out excited energy from one port at the other port by using an opposite polarization (i.e., a cross polarization).

Figure 1:
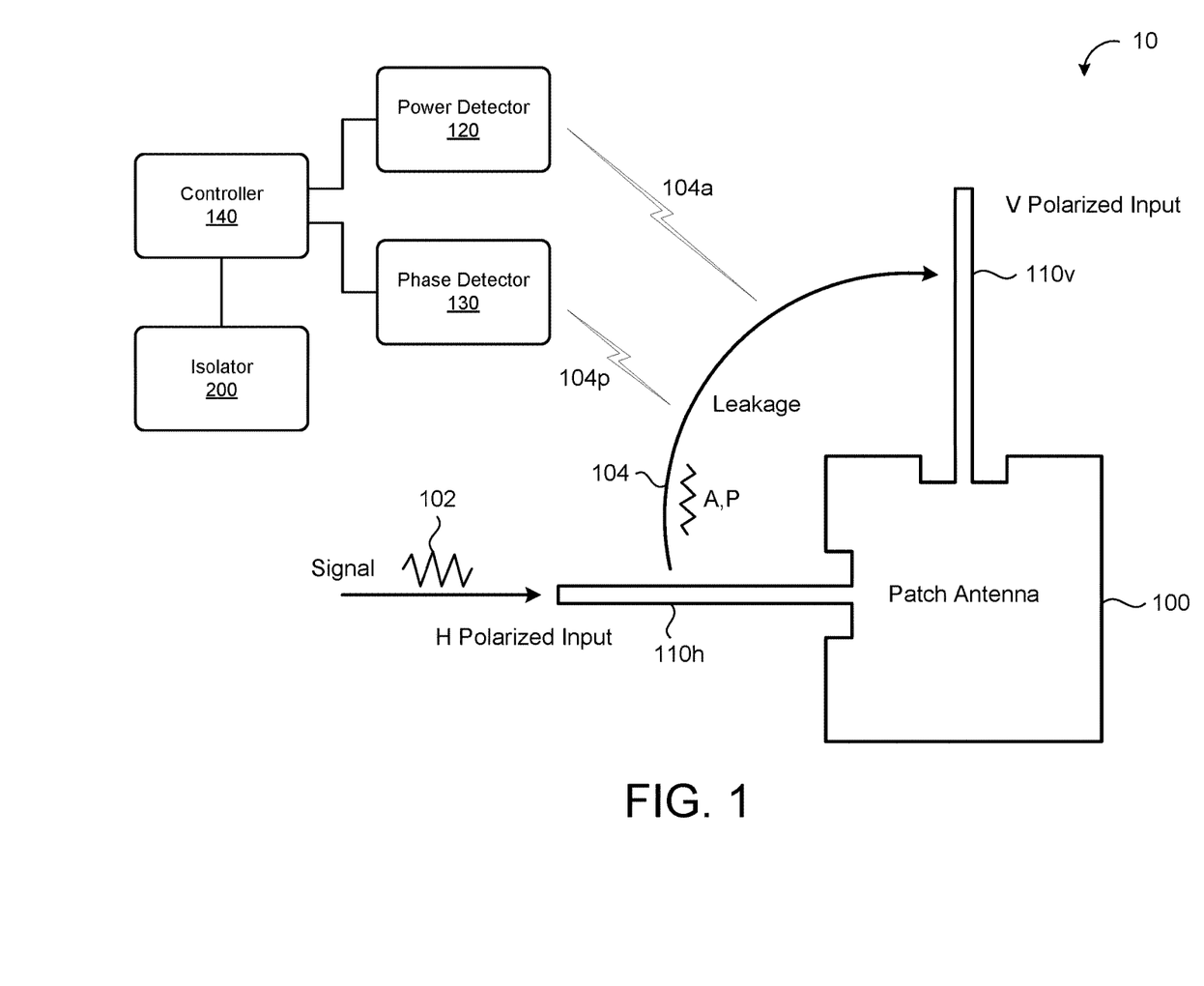
FIG. 1 is schematic view of an example communication system.

Referring to FIG. 1, in some implementations, a communication system 10 includes an antenna 100, such as a dual-polarized patch antenna, having a horizontal polarized input port 110$h$ and a vertical polarized input port 110$v$, a power detector 120, a phase detector 130, a controller 140, and an isolator 200. The antenna 100 can receive a signal 102 at either input port 110$h$, 110$v$. The antenna 100 may be susceptible to port isolation and cross polarization between the input ports 110$h$, 110$v$, where the received signal 102 leaks from one input port 110$h$, 110$v$ to the other. The power detector 120 detects a signal power leakage 104$a$ corresponding to an amplitude A of the leakage signal 104. The power detector 120 may utilize detection techniques, such as peak amplification, logarithmic amplification, or RMS conversion depending on the input signal 102. In some examples, the power detector 120 is a device with an arrangement of circuitry configured to generate an output voltage representing an input signal power. For instance, the power detector 120 may be on a radio board converting a signal 102 to an output voltage and then supplying the output voltage to a controller 140 or processing circuitry. The phase detector 130 detects a signal phase leakage 104$b$ corresponding to a phase P of the leakage signal 104. The phase detector 130 may be any device configured to compare signal inputs and represent the difference between the signal inputs as a voltage output signal. Examples of phase detectors 130 include a frequency mixer, an analog multiplier, or a logic circuit. The controller 140 communicates with the power detector 120 and the phase detector 130. In some implementations, the controller 140 is configured to receive the voltage outputs of the power detector 120 and the phase detector 130 corresponding to the detected signal power leakage 104$a$ and the detected signal phase leakage 104$b$. Based on the detected signal power leakage 104$a$ and the detected signal phase leakage 104$b$, the controller 140 instructs the isolator 200 to cancel out the excited energy from one input port 110$h$, 110$v$ to the other. In some instances, the controller 140 is a microcontroller, a field programmable gate array (FPGA), system on chip (SoC), or an application specific integrated circuit (ASIC). The power detector 120 and the phase detector 130 may be part of the controller 140 or separate from the controller 140.

Figure 2A:
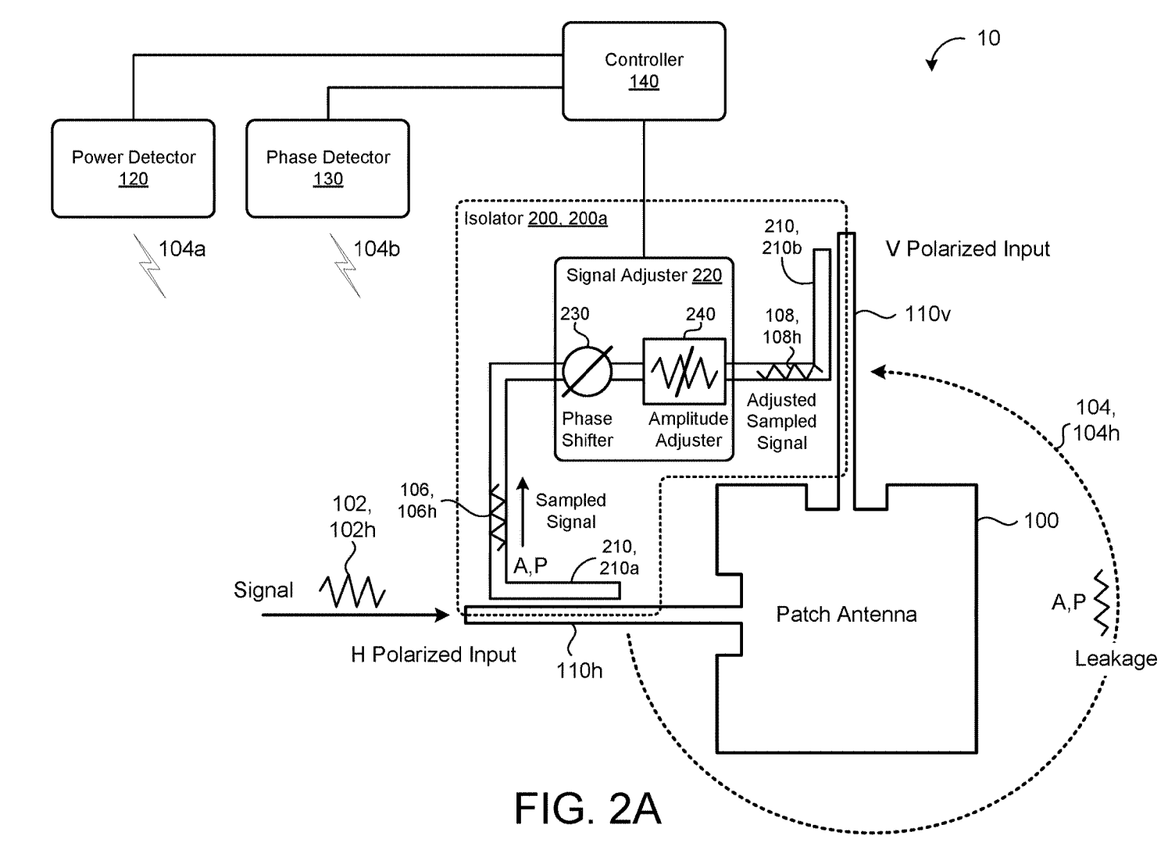
FIG. 2A is a schematic view of an example communication system including an antenna having a horizontal polarized input port and a vertical polarized input port and a port isolator configured to cancel out any cross polarization between the horizontal polarized input port and the vertical polarized input port.

FIG. 2A illustrates an example isolator 200, 200$a$ of the communication system 10 cancelling out the excited energy from the horizontal polarized input port 110$h$ to the vertical polarized input port 110$v$. In the example shown, the isolator 200, 200$a$ includes a first signal coupler 210, 210$a$ configured to sample a signal 102, 102$h$ received on the horizontal polarized input port 110$h$, as a sampled signal 106, 106$h$. Generally, signal couplers 210 place transmission lines in close proximity such that excited energy flowing through one line passes to the other line. The sampled signal 106 is an example of energy that passes from the horizontal polarized input port 110$h$ to another circuit line of a signal coupler 210, 210$a$. The first signal coupler 210, 210$a$ is electrically coupled to a signal adjuster 220, which is electrically coupled to a second signal coupler 210, 210$b$. This electronic coupling may be any connecting circuit capable of transferring the energy of the sampled signal 106. At least one signal coupler 210 may be a directional coupler, a broad line coupler, a branch line coupler, or a hybrid coupler. The type of coupler selected depends on the application. For example, a branch line coupler or a hybrid coupler generates more than one output. In some applications, more than one output is helpful because it may produce a 90 degree phase shift. Alternatively, a configuration may require a 180 degree phase shift, which may be achieved by configuring a hybrid coupler with another 90 degree phase shift coupler.

The signal adjuster 220 is configured to adjust the sampled signal 106 such that an adjusted sampled signal 108 cancels out any excited energy from the input port 110$h$, 110$v$ receiving the signal 102 to the other input port 110$h$, 110$v$. For example, the signal adjuster 220 is configured to adjust the sampled signal 106 such that the adjusted sampled signal 108 substantially cancels out the signal power leakage 104$a$ and the signal phase leakage 104$b$ of a leakage signal 104 from the input port 110$h$, 110$v$ receiving the signal 102 to the other input port 110$h$, 110$v$. In the example shown in FIG. 2A, the isolator 200, 200$a$ adjusts the sampled signal 106, 106$h$ of a signal 102, 102$h$ received at the horizontal polarized input port 110$h$ to have an amplitude A and a phase P that cancels out or substantially cancels out a leakage signal 104, 104$h$ leaking from the horizontal polarized input port 110$h$ to the vertical polarized input port 110$v$. In some implementations, the signal adjuster 220 includes a phase shifter 230 and/or an amplitude adjuster 240. While the phase shifter 230 is shown as adjusting the sampled signal 106 before the amplitude adjuster 240 adjusts the sampled signal 106, any arrangement is possible. For example, a circuit implementing the signal adjuster 220 may adjust the phase and/or amplitude of the sampled signal 106 concurrently or in a serial fashion, which can be in any order. The phase shifter 230 may be any arrangement of circuitry configured to provide a signal out of phase with the signal phase leakage 104$p$ to cause substantial cancellation of the leakage signal 104. For example, potential circuit arrangements include an all-pass filter, an arrangement of passive electronic components, such as resistors and capacitors, or digital potentiometers. Other arrangements are possible as well. In some instances, the signal power leakage 104$a$ is a low level signal, e.g., ranging about 25 dB lower than the signal 102. For those or additional instances, the amplitude adjuster 240 can reduce the power or the amplitude A of the sampled signal 106 to a power level substantially matching the signal power leakage 104$a$. The amplitude adjuster 240 may be any component capable of reducing the amplitude or the power of a signal, such as a variable attenuator or a voltage divider network.

The second signal coupler 210, 210$b$ receives the adjusted sampled signal 108 from the signal adjuster 220 and imparts the adjusted sampled signal 108 to the other input port 110$h$, 110$v$. In the example shown in FIG. 2A, the second signal coupler 210, 210b receives the adjusted sampled signal 108h from the signal adjuster 220 and imparts the adjusted sampled signal 108 to the vertical polarized input port 110v.

Figure 2B:
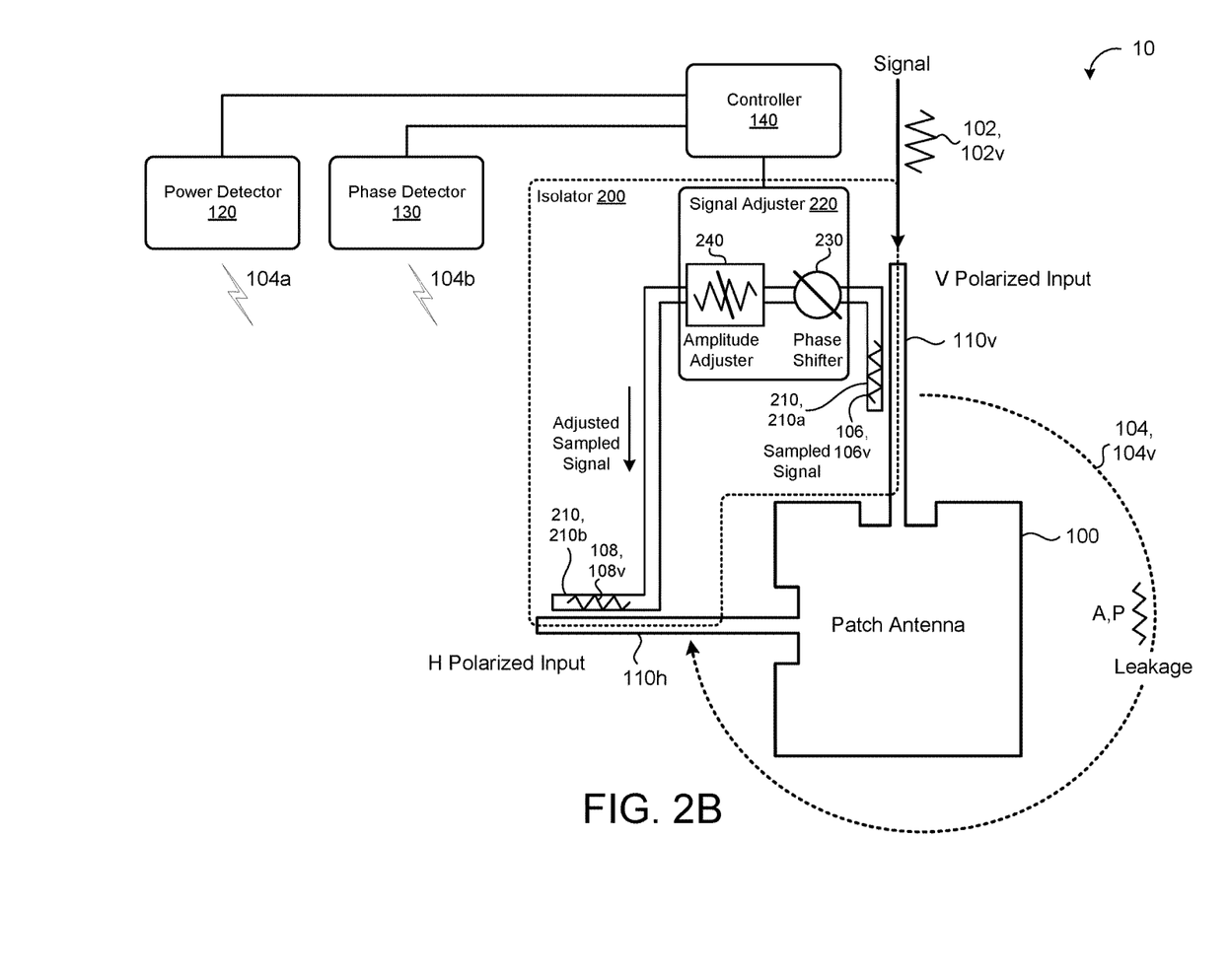
FIG. 2B is a schematic view of an example communication system including an antenna having a horizontal polarized input port and a vertical polarized input port and a port isolator configured to cancel out any cross polarization between the vertical polarized input port and the horizontal polarized input port.
Figure 2C:
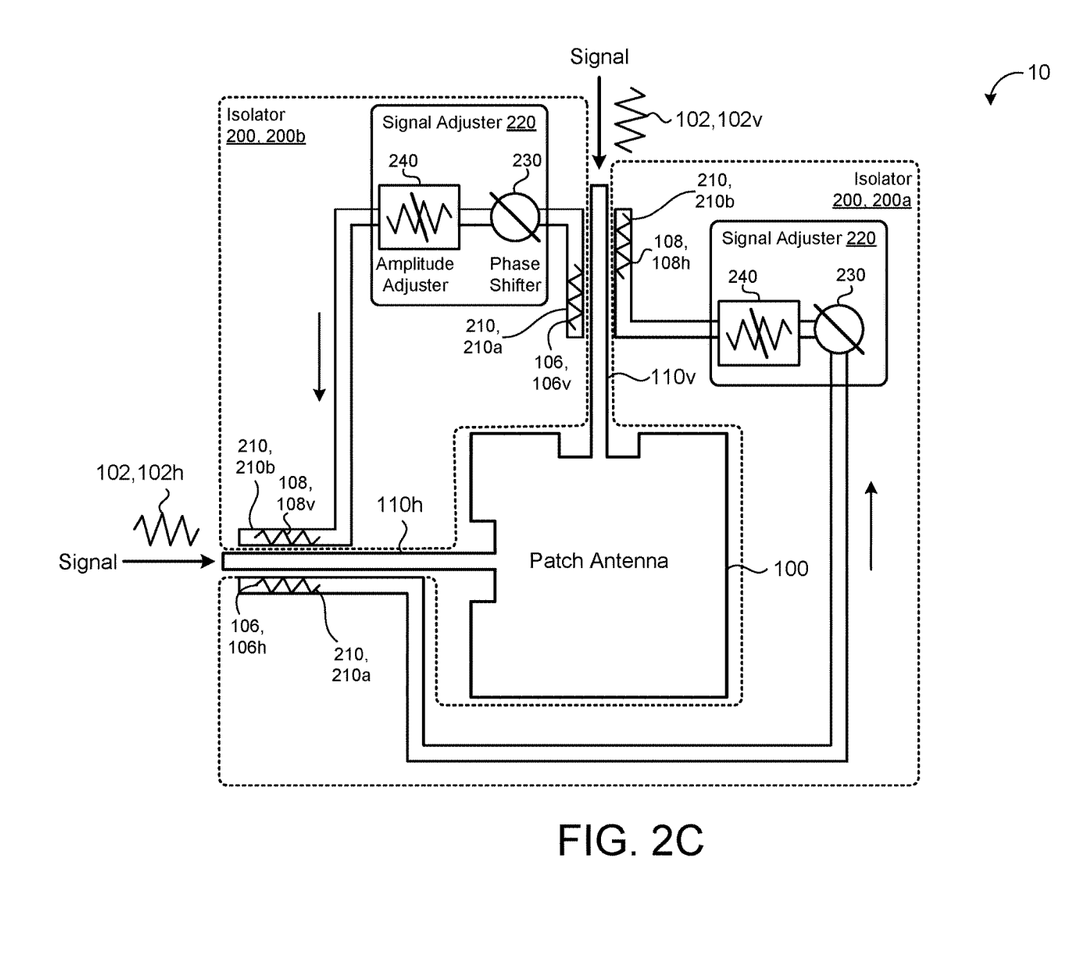
FIG. 2C is a schematic view of an example communication system including an antenna having a horizontal polarized input port and a vertical polarized input port and two port isolators configured to cancel out any cross polarization between the two input ports.

FIGS. 2B and 2C illustrate additional implementations for canceling out excited energy from one port of an antenna 100 at another port of the antenna 100 (e.g., at the horizontal polarized input port 110h or the vertical polarized input port 110v, or at both input ports, 110h, 110v). FIG. 2B illustrates an example communication system 10 having an isolator 200, 200b configured to cancel out the excited energy from the vertical polarized input port 110v to the horizontal polarized input port 110h. In the example shown, the isolator 200, 200b includes a first signal coupler 210, 210a electrically coupled to a signal adjuster 220, which is electrically coupled to a second signal coupler 210, 210b. The first signal coupler 210a samples a signal 102, 102v received at the vertical polarized input port 110v of the antenna 100 to obtain a sampled signal 106, 106v. The signal adjuster 220 adjusts the sampled signal 106, 106v to cancel out or substantially cancel out a leakage signal 104, 104v from the vertical polarized input port 110v to the horizontal polarized input port 110h. In some examples, the signal adjuster 220 adjusts the sampled signal 106, 106v based on a signal power leakage 104a corresponding to an amplitude A of the leakage signal 104v, as measured by the power detector 120, and/or a signal phase leakage 104b corresponding to a phase P of the leakage signal 104v, as measured by the phase detector 130. As discussed above, the signal adjuster 220 may include a phase shifter 230 and an amplitude adjuster 240 arranged in parallel or in series in any order. The second signal coupler 210b receives an adjusted sampled signal 108, 108v from the signal adjuster 220 and imparts the adjusted sampled signal 108, 108v to the horizontal polarized input port 110h to cancel out or substantially cancel out any leakage signal 104v received at the horizontal polarized input port 110h from the vertical polarized input port 110v, thereby providing port isolation and low cross polarization between the input ports 110h, 110v.

FIG. 2C illustrates an example communication system 10 having a first isolator 200, 200a configured to cancel out the excited energy from the horizontal polarized input port 110h to the vertical polarized input port 110v and a second isolator 200, 200b configured to cancel out the excited energy from the vertical polarized input port 110v to the horizontal polarized input port 110h. The example shown in FIG. 2C implements the first isolator 200, 200a in accordance with the example shown in FIG. 2A and the second isolator 200, 200b in accordance with the example shown in FIG. 2B; however, other implementations are possible as well. For example, the first isolator 200, 200a and the second isolator 200, 200b may share the same signal adjuster 220 or have separately operating signal adjusters 220 as shown. Moreover, the first isolator 200, 200a and the second isolator 200, 200b may share common signal couplers 210 on the respective input ports 110h, 110v of the antenna. For example, the horizontal polarized input port 110h may have a common signal coupler 210 for sampling the signal 102, 102h received at the horizontal polarized input port 110h for the first isolator 200, 200a and for imparting the adjusted sampled signal 108v of the second isolator 200, 200b to the horizontal polarized input port 110h for cancelling out (isolating) the leakage signal 104v from the vertical polarized input port 110v to the horizontal polarized input port 110h. Similarly, the vertical polarized input port 110v may have a common signal coupler 210 for sampling the signal 102, 102v received at the vertical polarized input port 110v for the second isolator 200, 200b and for imparting the adjusted sampled signal 108h of the first isolator 200, 200a to the vertical polarized input port 110v for canceling out (isolating) the leakage signal 104h from the horizontal polarized input port 110h to the vertical polarized input port 110v.

Figure 2D:
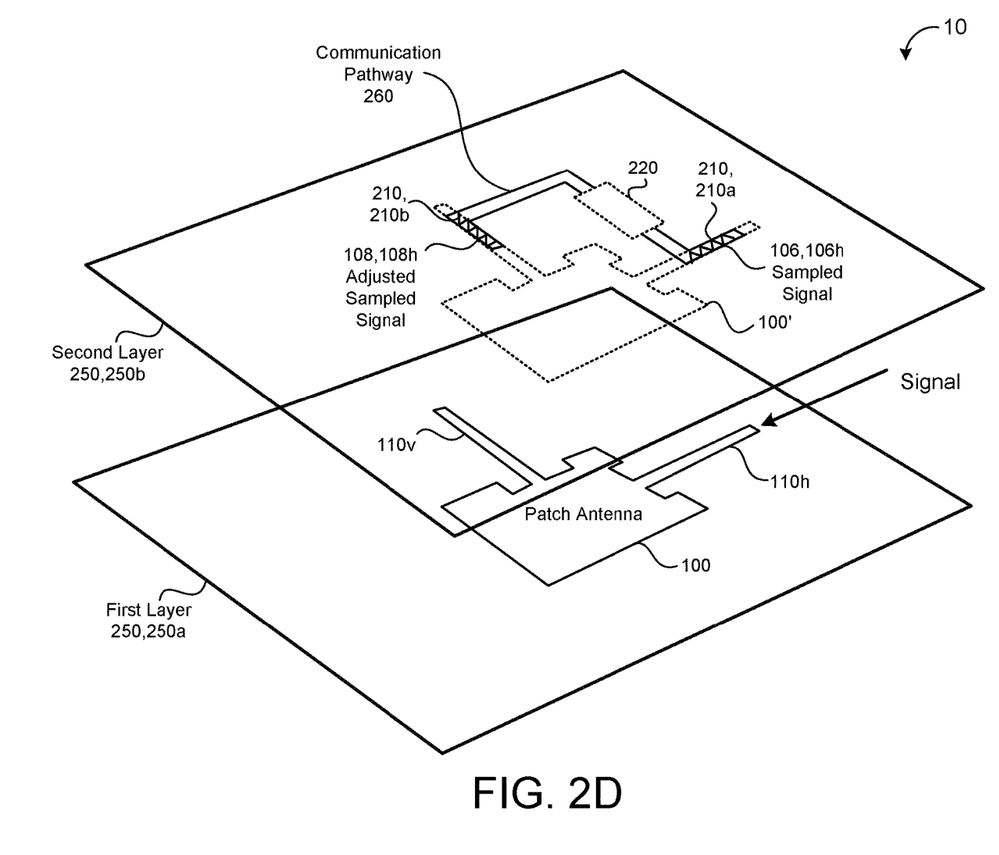
FIG. 2D is a schematic view of an example multi-layer communication system including an antenna and a communication pathway.
Figure 2E:
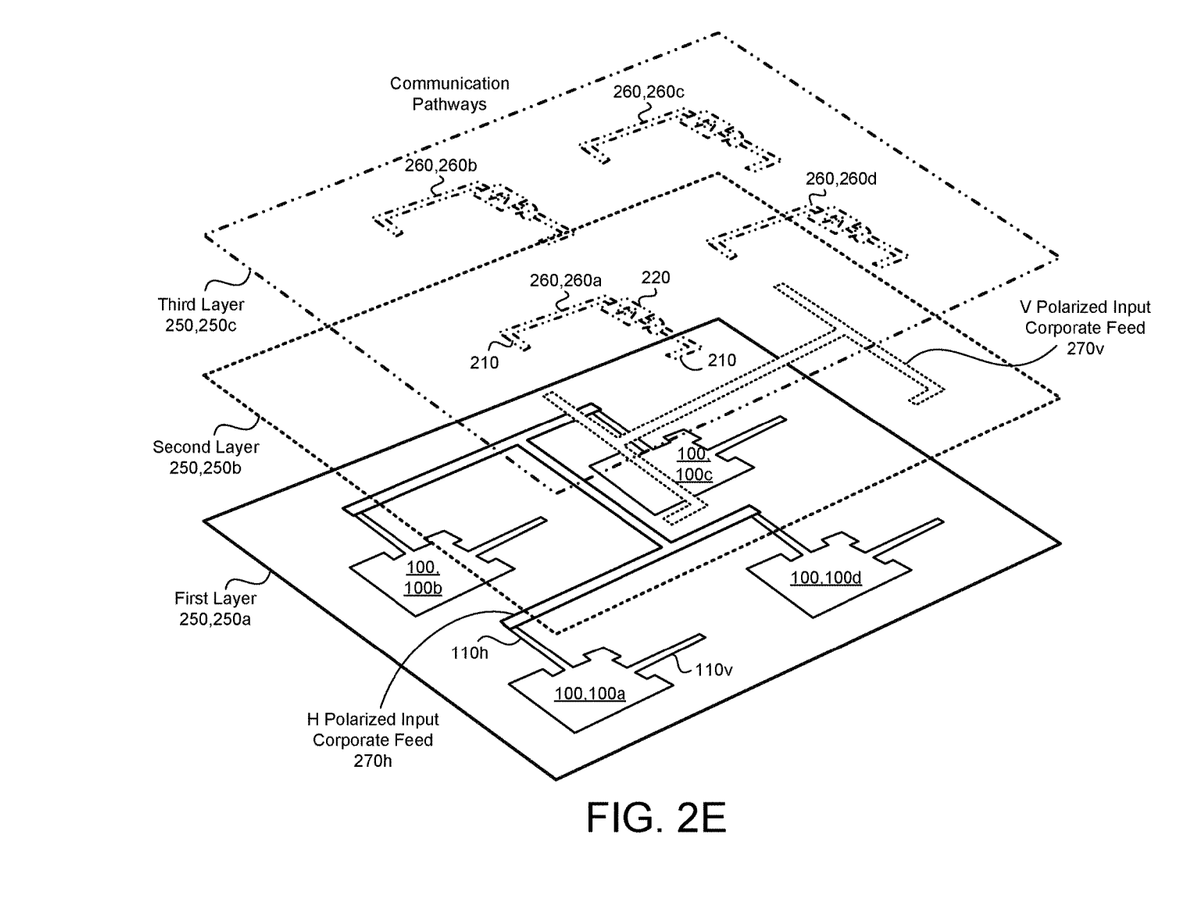
FIG. 2E is a schematic view of an example multi-layer communication system for an antenna array.

FIGS. 2D and 2E illustrate example communication systems 10 having isolators 200 implemented on more than one substrate layer 250. For ease of understanding, at least a portion of the isolator 200, for example, at least one of the first signal coupler 210, 210a, the signal adjuster 220, or the second signal coupler 210, 210b, form a communication pathway 260. In some implementations, the communication pathway 260 carries the sampled signal 106 and/or the adjusted signal 108 across more than one substrate layer 250. For example, the communication pathway 260 may travel across multiple substrate layers 250 by means of vias or other multi-layer electric coupling. FIGS. 2D and 2E illustrate two of many possible multi-layer configurations.

FIG. 2D illustrates an example implementation of the communication system 10 having the antenna 100 on a first substrate layer 250, 250a and a communication pathway 260 on a second substrate layer 250, 250b, where the communication pathway 260 includes at least the signal couplers 210 of the isolator 200. The remaining portions of the isolator 200 may reside on the first substrate layer 250, 250a and/or the second substrate layer 250, 250b. Alternatively, the signal couplers 210 may be adjacent to the input ports 110h, 110v of the antenna 100 on the first layer 250a and form a portion of a communication pathway 260 extending into the second substrate layer 250, 250b to convey the sampled signal 106 to the signal adjuster 220 on the second layer 250b and then returning the adjusted signal 108 to the second signal coupler 210, 210b on the first layer 250a.

In some examples, the system 10 includes first and second substrate layers 250a, 250b and a communication pathway 260. The antenna 100 may be disposed on the first substrate layer 250a. The communication pathway 260 includes at least one port isolator 200 and electrically couples together the first signal coupler 210a, the signal adjuster 220, and the second signal coupler 210b. In some implementations, the communication pathway 260 is disposed on at least one of the first substrate layer 250a or the second substrate layer 250b. For example, the first and second couplers 210a, 210b may be disposed on the first substrate layer 250a and/or the signal adjuster 220 may be disposed on the second substrate layer. In additional implementations, the communication pathway 260 is disposed entirely on the second substrate layer 250b.

FIG. 2E illustrates an example multi-layer implementation of the communication system 10, which advantageously increases circuit real estate for complex antenna configurations, such as antenna arrays. Circuit real estate corresponds to the amount of potential space on a substrate layer 250 for circuit components and circuitry.

In the example shown, a first substrate layer 250, 250a includes multiple antennas 100, 100a-d arranged as a 2×2 antenna array. The horizontal polarized input 110h of each antenna 100, 100a-d is electrically coupled to a horizontal polarized input corporate feed 270h on a first substrate layer 250, 250a. Similarly, the vertical polarized input 110v of each antenna 100, 100a-d is electrically coupled to a vertical polarized input corporate feed 270v on a second substrate layer 250, 250b. A third substrate layer 250, 250c includes an array of communication pathways 260, 260a-d corresponding to each antenna 100 in the array for implementing corresponding isolators 200. As in previous examples, the communication pathway 260 transfers a sampled signal 106 to a signal adjuster 220, which adjusts the sampled signal 106 to provide an adjusted signal 108 configured to substantially cancel a leakage signal 104 from a corresponding input port 110h, 110v. FIG. 2E depicts only one communication pathway 260 per antenna 100, but the design may be scaled to cancel leakage signals 104 across both input ports 110h, 110v.

Figure 2F:
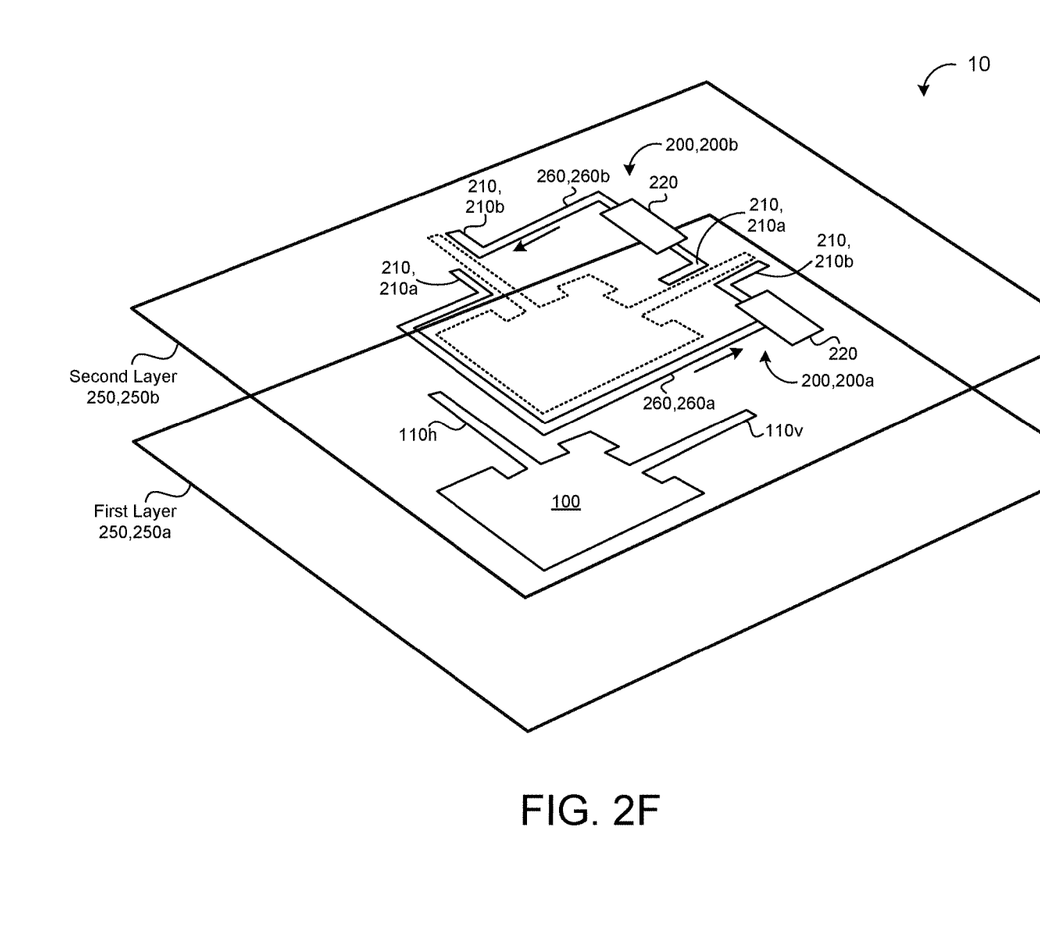
FIG. 2F is a schematic view of an example multi-layer communication system including an antenna and multiple communication pathways.

Referring to FIGS. 2C and 2F, in some implementations, the system 10 includes first and second port isolators 200a, 200b for the antenna 100. The first signal coupler 210a of the first port isolator 200a is configured to sample a first signal 102h received on the horizontal polarization input port 110h of the antenna 100. The second signal coupler 210b of the first port isolator 200a is electrically coupled to the vertical polarization input port 110v of the antenna 100. The signal adjuster 220 of the first port isolator 200a is configured to adjust a phase P and an amplitude A of the sampled first signal 106h based on a leakage power 104a and a leakage phase 104b of a first leakage signal 104h from the horizontal polarization input port 110h of the antenna 100 to the vertical polarization input port 110v of the antenna 100. The adjusted sampled first signal 108h substantially cancels out the leakage power 104a and leakage phase 104b of the first leakage signal 104h from the horizontal polarization input port 110h of the antenna 100 to the vertical polarization input port 110v of the antenna 100. The first signal coupler 210a of the second port isolator 200b is configured to sample a second signal 102v received on the vertical polarization input port 110v of the antenna 100 and the second signal coupler 210b of the second port isolator 200b is electrically coupled to the horizontal polarization input port 110h of the antenna 100. The signal adjuster 220 of the second port isolator 200b is configured to adjust a phase P and an amplitude A of the sampled second signal 106v based on a leakage power 104a and a leakage phase 104b of a second leakage signal 104v from the vertical polarization input port 110v of the antenna 100 to the horizontal polarization input port 110h of the antenna 100. The adjusted sampled second signal 108v substantially cancels out the leakage power 104a and leakage phase 104b from the vertical polarization input port 110v of the antenna 100 to the horizontal polarization input port 110h of the antenna 100.

In the example shown, the system 10 includes first and second substrate layers 250a, 250b, where the antenna 100 is disposed on the first substrate layer 250a and first and second communication pathways 260a, 260b are disposed on the second substrate layer 250b. The first communication pathway 260a includes the first port isolator 200a and electrically couples together the first signal coupler 210a, the signal adjuster 220, and the second signal coupler 210b of the first port isolator 200a. The second communication pathway 260b includes the second port isolator 200b and electrically couples together the first signal coupler 210a, the signal adjuster 220, and the second signal coupler 210b of the second port isolator 200b. The first communication pathway 260a and the second communication pathway 260b may each be disposed on at least one of the first substrate layer 250a or the second substrate layer 250b. In the example shown, the first communication pathway 260a and the second communication pathway 260b are disposed entirely on the second substrate layer 250b; however other configurations are possible as well. For example, the first and second signal couplers 210a, 210b of each port isolator 200a, 200b may be disposed on the first substrate layer 250a and the signal adjusters 220 of each port isolator 200a, 200b may be disposed on the second substrate layer 250b. In additional implementations, any portion of any communication pathway 260 may traverse more than one substrate layer 250 for routing purposes or other purposes. For example, the antenna 100 and the first and second communication pathways 260a, 260b may be disposed on the first substrate layer 250a, but a portion of one or both of the communication pathways 260a, 260b is routed through the second substrate layer 250b (e.g., to avoid crossing electrical paths on the same substrate layer 250). In yet further implementations, the system 10 includes a third substrate layer 250c (e.g., as described with reference to FIG. 2E), where the first communication pathway 260a and the second communication pathway 260b are disposed on one or more of the second substrate layer 250b and the third substrate layer 250c.

Figure 3:
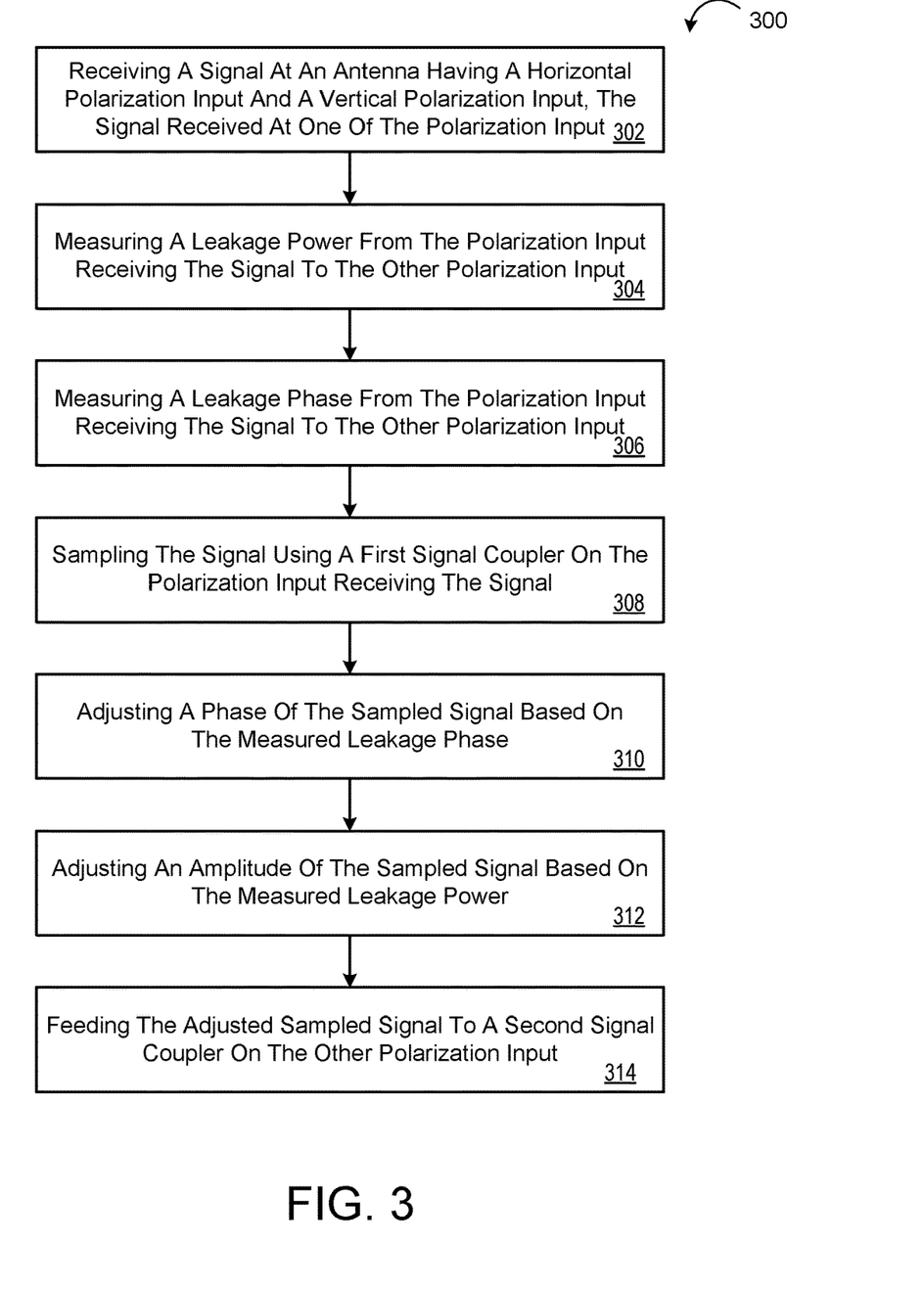
FIG. 3 is a flowchart of an example arrangement of operations for a method of isolating cross polarization on a dual port antenna.

FIG. 3 provides an example arrangement of operations of a method 300 of isolating an input port 110h, 110v of an antenna 100, such as a dual polarized patch antenna. At block 302, the method 300 includes receiving a signal 102 at an antenna 100 having a horizontal polarization input port 110h and a vertical polarization input port 110v, the signal 102 received at one of the input ports 110h, 110v. At block 304, the method 300 further includes measuring, by a power detector 120, a signal power leakage 104a of a leakage signal 104 from the input port 110h, 110v receiving the signal 102 to the other input port 110h, 110v and, at block 306, measuring, by a phase detector 130, a signal phase leakage 104b of the leakage signal 104 from the input port 110h, 110v receiving the signal 102 to the other input port 110h, 110v. At block 308, the method 300 includes sampling the signal 102 using a first signal coupler 210a on the input port 110h, 110v receiving the signal 102, as a sampled signal 106. At block 310, the method 300 includes adjusting, by a signal adjuster 220, a phase P of the sampled signal 106 based on the measured leakage phase 104b and, at block 312, adjusting, by the signal adjuster 220, an amplitude A of the sampled signal 106 based on the measured leakage power 104a, resulting in an adjusted sampled signal 108. At block 314, the method 300 includes feeding the adjusted sampled signal 108 to a second signal coupler 210b on the other input port 110h, 110v. The adjusted sampled signal 108 substantially cancels out the leakage power 104a and leakage phase 104b from the input port 110h, 110v receiving the signal to the other input port 110h, 110v.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A port isolator for an antenna having a horizontal polarization input port and a vertical polarization input port, the port isolator comprising:
   a first signal coupler configured to sample a signal received on one of:
   the horizontal polarization input port of the antenna; or
   the vertical polarization input port of the antenna;
   a signal adjuster electrically coupled to the first signal coupler, the signal adjuster comprising:
   a phase shifter; and
   an amplitude adjuster;
   a second signal coupler electrically coupled to the signal adjuster and the other one of the input ports of the antenna;
   a power detector configured to measure a leakage power of a leakage signal from the input port receiving the signal to the other input port;
   a phase detector configured to measure a leakage phase of the leakage signal from the input port receiving the signal to the other input port; and
   a controller in communication with the signal adjuster, the controller configured to:
   instruct the phase shifter to adjust a phase of the sampled signal based on the leakage phase; and
   instruct the amplitude adjuster to adjust an amplitude of the sampled signal based on the leakage power; and
   a bidirectional communication pathway electrically coupling together the first signal coupler, the signal adjuster, and the second signal coupler,
   wherein the adjusted phase of the sampled signal substantially cancels out the leakage phase from the input port receiving the signal to the other input port and the adjusted amplitude of the sampled signal substantially cancels out the leakage power from the input port receiving the signal to the other input port.

2. The port isolator of claim 1, wherein at least one signal coupler comprises a directional coupler, a broad line coupler, a branch line coupler, or a hybrid coupler.

3. The port isolator of claim 1, wherein the amplitude adjuster comprises a variable attenuator.

4. A system comprising:
   an antenna having a horizontal polarization input port and a vertical polarization input port; and
   at least one port isolator comprising:
   a first signal coupler configured to sample a signal received on one of:
   the horizontal polarization input port of the antenna; or
   the vertical polarization input port of the antenna;
   a signal adjuster electrically coupled to the first signal coupler, the signal adjuster comprising:
   a phase shifter; and
   an amplitude adjuster;
   a second signal coupler electrically coupled to the signal adjuster and the other one of the input ports of the antenna;
   a power detector configured to measure a leakage power of a leakage signal from the input port receiving the signal to the other input port;
   a phase detector configured to measure a leakage phase of the leakage signal from the input port receiving the signal to the other input port; and
   a controller in communication with the power detector, the phase detector, and the signal adjuster, the controller configured to:
   instruct the phase shifter to adjust a phase of the sampled signal based on the leakage phase; and
   instruct the amplitude adjuster to adjust an amplitude of the sampled signal based on the leakage power; and
   a bidirectional communication pathway electrically coupling together the first signal coupler, the signal adjuster, and the second signal coupler,
   wherein the adjusted phase of the sampled signal substantially cancels out the leakage phase from the input port receiving the signal to the other input port and the adjusted amplitude of the sampled signal substantially cancels out the leakage power from the input port receiving the signal to the other input port.

5. The system of claim 4, further comprising first and second substrate layers, the antenna disposed on the first substrate layer, wherein the bidirectional communication pathway is disposed on at least one of the first substrate layer or the second substrate layer.

6. The system of claim 5, wherein the first and second signal couplers of the at least one port isolator are disposed on the first substrate layer and the signal adjuster of the at least one port isolator is disposed on the second substrate layer.

7. The system of claim 5, wherein the bidirectional communication pathway is disposed entirely on the second substrate layer.

8. The system of claim 5, further comprising a third substrate layer, wherein the bidirectional communication pathway is disposed on the second substrate layer and the third substrate layer.

9. A system comprising:
an antenna having a horizontal polarization input port and a vertical polarization input port; and
a first port isolator; and
a second port isolator,
wherein the first port isolator and the second port isolator each comprise:
a first signal coupler configured to sample a signal received on one of:
the horizontal polarization input port of the antenna; or
the vertical polarization input port of the antenna;
a signal adjuster electrically coupled to the first signal coupler, the signal adjuster comprising:
a phase shifter; and
an amplitude adjuster;
a second signal coupler electrically coupled to the signal adjuster and the other one of the input ports of the antenna; and
a bidirectional communication pathway electrically coupling together the first signal coupler, the signal adjuster, and the second signal coupler,
wherein the signal adjuster adjusts a phase and an amplitude of the sampled signal in response to a leakage power and a leakage phase of a leakage signal from the input port receiving the signal to the other input port, the adjusted phase and the adjusted amplitude of sampled signal substantially cancelling out the leakage power and leakage phase from the input port receiving the signal to the other input port,
wherein the first signal coupler of the first port isolator is configured to sample a first signal received on the horizontal polarization input port of the antenna and the second signal coupler of the first port isolator is electrically coupled to the vertical polarization input port of the antenna, the signal adjuster of the first port isolator configured to adjust the phase and the amplitude of the sampled first signal based on the leakage power and the leakage phase of a first leakage signal from the horizontal polarization input port of the antenna to the vertical polarization input port of the antenna, the adjusted phase and the adjusted amplitude of the sampled first signal substantially cancelling out the leakage power and leakage phase from the horizontal polarization input port of the antenna to the vertical polarization input port of the antenna, and
wherein the first signal coupler of the second port isolator is configured to sample a second signal received on the vertical polarization input port of the antenna and the second signal coupler of the second port isolator is electrically coupled to the horizontal polarization input port of the antenna, the signal adjuster of the second port isolator configured to adjust the phase and the amplitude of the sampled second signal based on the leakage power and the leakage phase of a second leakage signal from the vertical polarization input port of the antenna to the horizontal polarization input port of the antenna, the adjusted phase and the adjusted amplitude of the sampled second signal substantially cancelling out the leakage power and leakage phase from the vertical polarization input port of the antenna to the horizontal polarization input port of the antenna.

10. The system of claim 9, further comprising:
first and second substrate layers, the antenna disposed on the first substrate layer,
wherein each bidirectional communication pathway is disposed on at least one of the first substrate layer or the second substrate layer.

11. The system of claim 9, wherein the first and second signal couplers of each port isolator are disposed on the first substrate layer and the signal adjusters of each port isolator is disposed on the second substrate layer.

12. The system of claim 10, wherein both bidirectional communication pathways are disposed entirely on the second substrate layer.

13. The system of claim 10, further comprising a third substrate layer, wherein the bidirectional communication pathway of the first port isolator and the bidirectional communication pathway of the second port isolator are disposed on the second substrate layer and the third substrate layer respectively.

14. The system of claim 4, wherein at least one signal coupler comprises a directional coupler, a broad line coupler, a branch line coupler, or a hybrid coupler.

15. The system of claim 4, wherein the amplitude adjuster comprises a variable attenuator.

16. A system comprising:
an antenna having a horizontal polarization input port and a vertical polarization input port;
a first signal coupler configured to sample a signal received on one of the input ports;
a signal adjuster electrically coupled to the first signal coupler, the signal adjuster comprising:
a phase shifter; and
an amplitude adjuster;
a second signal coupler electrically coupled to the signal adjuster and the other one of the input ports of the antenna;
a bidirectional communication pathway electrically coupling together the first signal coupler, the signal adjuster, and the second signal coupler;
a power detector configured to measure a leakage power from the input port receiving the signal to the other input port;
a phase detector configured to measure a leakage phase from the input port receiving the signal to the other input port; and
a controller in communication with the power detector, the phase detector, and the signal adjuster, the controller configured to:
instruct the phase shifter to adjust a phase of the sampled signal based on the leakage phase measured by the phase detector; and instruct the amplitude adjuster to adjust an amplitude of the sampled signal based on the leakage power measured by the power detector, wherein the adjusted sampled signal substantially cancels out the leakage power and the leakage phase from the input port receiving the signal to the other input port.

\* \* \* \* \*